US005156397A

United States Patent [19]

Valenza, Jr.

[11] Patent Number: 5,156,397

[45] Date of Patent: Oct. 20, 1992

[54] APPARATUS FOR AUTOMATED MARKING OF A BET SLIP

[76] Inventor: Samuel W. Valenza, Jr., 108 Stratford Ave., Westmont, N.J. 08108

[21] Appl. No.: 776,892

[22] Filed: Oct. 15, 1991

Related U.S. Application Data

[63] Continuation of Ser. No. 408,168, Sep. 15, 1989, abandoned.

[51] Int. Cl.[5] .......................... A63F 9/00; G06F 15/44

[52] U.S. Cl. ............................ 273/138 A; 273/148 R; 364/412; 283/903; 235/381

[58] Field of Search ........... 273/138 A, 144 R, 148 R, 273/269; 364/410, 412; 283/49, 903; 235/381, 383

[56] References Cited

U.S. PATENT DOCUMENTS

| | | | |
|---|---|---|---|
| 4,108,361 | 8/1978 | Krause | 364/412 X |
| 4,108,364 | 8/1978 | Tanaka et al. | 235/419 |
| 4,277,064 | 7/1981 | Newman | 273/138 |
| 4,322,612 | 3/1982 | Lange | 235/419 |
| 4,323,770 | 4/1982 | Dieulot et al. | 235/375 |
| 4,586,710 | 5/1986 | Beam | 273/138 A |
| 4,677,553 | 6/1987 | Roberts et al. | 283/903 X |
| 4,689,742 | 8/1987 | Troy et al. | 364/412 |
| 4,692,863 | 9/1987 | Moosz | 364/412 |
| 4,713,787 | 12/1987 | Rapp | 364/717 |
| 4,788,419 | 11/1988 | Walters et al. | 235/381 |
| 4,833,307 | 5/1989 | Justiz | 235/375 |
| 4,875,164 | 10/1989 | Monfort | 273/138 A X |

FOREIGN PATENT DOCUMENTS

| | | | |
|---|---|---|---|
| 3243777 | 8/1983 | Fed. Rep. of Germany | 273/138 A |
| 888155 | 12/1981 | U.S.S.R. | 273/138 A |
| 2147773 | 5/1985 | United Kingdom | 273/138 A |

*Primary Examiner*—William H. Grieb
*Assistant Examiner*—Sebastiano Passaniti
*Attorney, Agent, or Firm*—Panitch Schwarze Jacobs & Nadel

[57] ABSTRACT

An apparatus for automated marking of bet slips for use in entering a customer wager into a independent lottery terminal includes a housing for receiving a bet slip. A selector actuatable by the customer is provided within the housing for permitting the customer to select a desired mode of operation from a plurality of alternative operational modes for marking the bet slip. A control within the housing communicates with the selector for identifying the mode selected by the customer and for generating electrical control signals in response to the selected mode. A printer within the housing communicates with the control for receiving the bet slip, for receiving the electrical control signals and for marking the bet slip in accordance with the received control signals.

13 Claims, 6 Drawing Sheets

APPARATUS FOR AUTOMATED MARKING OF A BET SLIP

CROSS-REFERENCE TO RELATED APPLICATION

This application is a continuation of copending U.S. application Ser. No. 07/408,168, filed Sep. 15, 1989, now abandoned.

BACKGROUND OF THE INVENTION

The present invention relates generally to an apparatus for the automated marking of a bet slip and, more particularly, to such an apparatus for marking such a bet slip for use in entering a customer wager into a wagering machine.

Many states in this country, and numerous foreign countries around the world, have adopted computerized lottery games as a means to raise additional revenue for general government use or for a specific purpose, such as to fund higher education or to assist senior citizens. Computerized or "on-line" lottery games have become popular, particularly within the northeastern and mid-Atlantic states. Typically, such lottery games are arranged or structured so that the wagering customer attempts to pick numbers that match a specific plurality of numbers, such as five, six or seven numbers, which are selected at a random drawing (usually using air-mixed ping pong balls) from a universe or established set of numbers that may range, for example, from thirty to eighty numbers. The lottery games are implemented, and the customer numbers are selected, through a lottery operated network of electronic, computer-controlled wagering terminals installed in retail and other locations, and communicating with a centralized computer via standard communication or telephone lines.

To make a wager, a customer may tell a lottery agent who operates the electronic terminal the selected numbers, but, more often, will hand the lottery agent a specialized "bet slip," usually in the form of a computer readable card, on which the customer has marked the selected numbers for the wager, generally by "filling" a number of spaced boxes on the bet slip, each box corresponding to a particular number within the particular number set for the game being played. Upon receipt of the marked bet slip, the lottery agent passes the bet slip through a mark-sense card reading device associated with the electronic wagering terminal which, in turn, reads and electronically records the selected numbers of the wager. The terminal also prints a lottery ticket with the selected numbers, date and other information, which is given to the customer as a receipt for the wager.

While such lottery games have been financially successful, typical lottery operations tend to reach revenue plateaus, which require expensive marketing efforts to maintain or exceed. Additionally, retail lottery agents, an integral part of the lottery system, are frequently disgruntled by the amount of revenue they receive as a commission for selling lottery tickets. Both the lottery officials and the retail lottery agents realize that, among other factors, the number of lottery tickets sold depends, in large part, on the speed and efficiency of the retail agent and the electronic wagering terminal in processing the bet slips and issuing the lottery tickets to the customers. However, lottery systems, as presently designed and operated, introduce procedures that increase inefficiencies and cause lost sales at the retail agent terminal.

One reason for such lost sales is that customers are required to fill out bet slips, on which the customers mark by hand the selection of numbers to be played. Frequently, the customers, unaware of the sensitivity of the mark-sense card reader associated with the electronic wagering terminal, mark the card incorrectly or in a manner that the card reader incorrectly interprets the markings on the bet slip. This causes delays in processing wagers in that the card reader either rejects the incorrectly marked bet slip or the customer is dissatisfied because the lottery ticket generated by the terminal does not reflect the correct number selections that the customer intended in marking the bet slip. In some cases, the customer does not immediately realize that the numbers on the lottery ticket are incorrect, which can cause difficulties and expense for the lottery agent and/or the lottery system, particularly if the customer's intended number selections are picked as winners. Additionally, customers frequently do not have a pencil or other marking device, which causes delay in preparing the bet slips and in processing the wagers. If the retail lottery agent supplies pencils or other marking devices for the customers, the additional cost involved reduces the commission received for selling the lottery tickets.

Further, lottery computer networks and their electronic wagering terminals are not 100% accurate in transferring the markings on the bet slips to internal computer data. An industry standard card reader error rate of between 1½% to 3% is deemed to be acceptable. Lotteries carry disclaimer statements printed on the back of the lottery tickets requiring the customer to check the selected numbers against the printed numbers generated by the electronic wagering terminal and assume responsibility regarding the accuracy of tickets issued. However, machine-produced inaccuracies have caused delay and/or other problems in connection with lottery systems.

Sales are also lost at the retail lottery agent's terminal because some lottery systems do not permit the customer to select random numbers for play. Customers generally like random number play because they believe that random selection of numbers offers a better chance of winning in a game in which the winning set of numbers is also selected by a random drawing.

Moreover, sales are lost at the retail lottery agent's terminal because, with few exceptions, lotteries do not offer the customer automatic mathematical permutations or combinations of numbers to play. Wagers made utilizing mathematical permutations of numbers reduce the odds against winning and increase the number of prizes won, if the customer is lucky enough to win. These methods of play have proven extremely successful in improving sales of lottery tickets in foreign jurisdictions which provide such methods.

Accordingly, there exists a need for a device that will improve the efficiency of sales at the retail lottery agent's terminal, increasing revenues for both the lottery system and the lottery agent, and offering the customer a more efficient means to mark bet slips, at the same time, offering the customer a variety of number selection services not generally available with present day lottery systems.

SUMMARY OF THE INVENTION

Briefly stated, the present invention comprises an apparatus for automated marking of a bet slip for use in entering a customer wager into a wagering machine. The apparatus comprises a housing for receiving a bet slip and a selection means within the housing. The selection means is actuatable by the customer for permitting the customer to select a desired mode of operation from a plurality of alternative operational modes for marking the bet slip. Control means within the housing and communicating with the selection means are employed for identifying the mode selected by the customer and for generating electrical control signals responsible thereto. Printer means, communicating with the control means, are provided for receiving the bet slip, for receiving the electrical control signals and for marking the bet slip in accordance with the received control signals.

BRIEF DESCRIPTION OF THE DRAWINGS

The foregoing summary, as well as the following detailed description, will be better understood when read in conjunction with the appended drawings. For the purpose of illustrating the invention, there is shown in the drawings an embodiment which is presently preferred, it being understood, however, that this invention is not limited to the precise arrangement and instrumentalities shown. In the drawings.

DESCRIPTION OF PREFERRED EMBODIMENT

Figure 1:
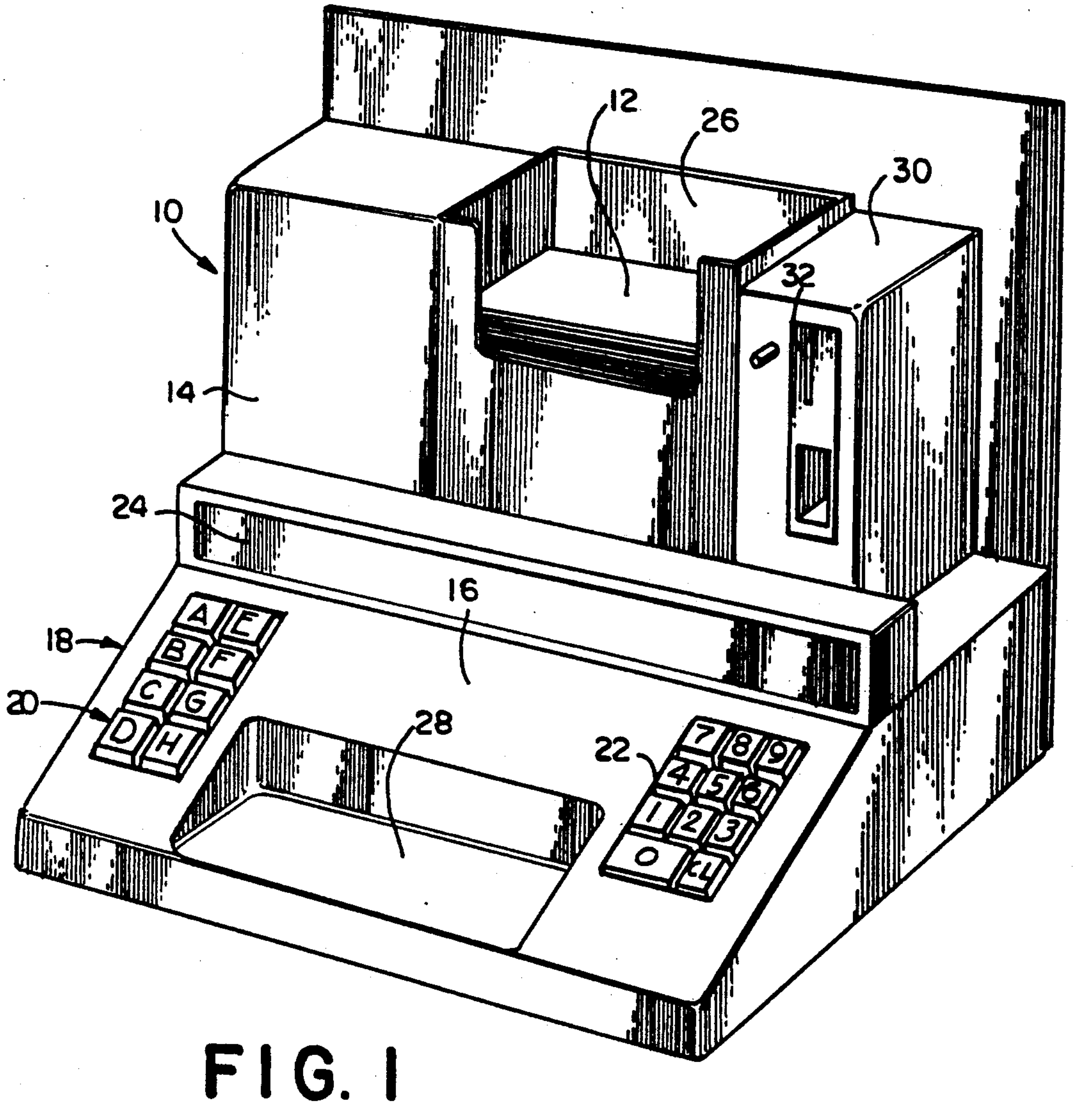
FIG. 1 is a perspective view of an apparatus for the automated marking of a bet slip in accordance with the present invention.

Referring now in greater detail to the drawings, in which like numerals indicate like elements throughout, there is shown in FIG. 1 a perspective view of an apparatus 10 for the automated marking of a bet slip 12. As discussed above, the bet slip 12 is preferably comprised of paper or light cardboard and is adapted to be inserted into a mark-sense card reading device or card reader (not shown) associated with a lottery wagering terminal or machine for entering a customer wager into the wagering machine. Typically, bet slips are generally rectangular in shape and may be of any particular length and width (usually standardized) suitable for use with the particular card reader. The particular material, as well as the size and shape of the bet slip 12, is not material to the present invention, which is employed for marking bet slips of any selected size, shape or material.

As shown in FIG. 1, the automated marking apparatus 10 is comprised of a generally box-like housing 14, preferably fabricated from metal, high strength plastic or any other suitable material. In the present embodiment, the housing 14 is sized and configured to be supported upon a shelf or counter (not shown) in the same manner in which a computerized lottery terminal (not shown) is generally supported. It will be appreciated by those skilled in the art that the housing 14 may be of a size and/or configuration other than that shown in FIG. 1 and may, alternatively, be self-supporting or may be wall mountable.

The housing 14 includes a generally angled front panel 16 upon the surface of which is positioned a selection means, in the present embodiment, a plurality of control keys, shown generally as 18. The control keys are employed for permitting a customer or user to select a desired mode of operation of the apparatus 10 from a plurality of operational modes. In the present embodiment, the control keys 18 are separated into two distinctive groups, a first group 20 located on the left-hand side of the front panel 16 (when viewing FIG. 1) and the second group 22 located on the right-hand side of the front panel 16. In the presently preferred embodiment, the control keys in the first group 20 are indicated as alphabetic keys and the control keys in the second group 22 are indicated as numeric keys. It will be appreciated by those skilled in the art that the particular type, number and arrangement of control keys 18 selected in the present embodiment are for the purpose of illustration only. Accordingly, the present invention is not limited to the precise number and/or arrangement of control keys as shown and described, but any other type, number and arrangement of control keys could alternatively be employed. In addition, it should be understood by those skilled in the art that the control keys 18 need not be separated into two groups in the manner shown.

One or more of the control keys 18 are actuatable by a customer or user much like a keyboard or pushbutton telephone for selecting the desired mode of operation of the apparatus 10 for marking the bet slip in a manner which will hereinafter be described in greater detail.

The housing 14 further includes display means, in the present embodiment, an elongated display screen 24 located within the housing 14 just above the front panel 16. The display screen 24, which in the present embodiment is a single line, liquid crystal display device, is capable of displaying selected functions, operating instructions and a plurality of numbers along a single line or sequence in order to display to a customer the wager or numbers which have been selected prior to the bet slip 12 being marked by the apparatus 10. Liquid crystal display screens of this type are well known in the art and commercially available from a variety of manufacturers. A detailed discussion of the structure and/or operation of the display screen 24 is not deemed necessary for a complete understanding of the present invention.

The housing 14 further includes a storage means or storage bin 26 for receiving and storing a plurality of bet slips 12 in a neatly stacked order. The storage bin 26 is preferably adjustable to receive bet slips 12 of varying size and shape for use with differing lotteries and/or card readers. Alternatively, the storage bin 26 could be of a single size, large enough to receive and stack the largest bet slip and may include tabs or other sizing devices (not shown) to facilitate smaller sized bet slips. The storage bin 26 is adapted to present the bet slips, one at a time, to a printer means or bet slip printer (not shown in FIG. 1) which is located within the housing 14. The printer is also a type which is generally well known in the art and commercially available from a variety of sources. A detailed discussion of the structure and/or operation of the bet slip printer is not necessary for a complete understanding of the present invention. The printer is adapted to receive a bet slip 12 from the supply of bet slips within the storage bin 26 and to mark the bet slip 12 in accordance with received electrical control signals by marking or printing in the appropriate locations on the bet slip. Once the bet slip 12 has been printed or marked, the printer ejects the printed bet slip from the housing 14 and into a bet slip receiving tray or bin 28. In the presently preferred embodiment, the bet slip receiving bin 28 is located on the front panel between the first and second group of control keys 20 and 22. In this manner, the customer can conveniently remove the marked bet slip from the receiving bin 28. It will be appreciated by those skilled in the art that while the apparatus 10, as shown in FIG. 1, includes a storage bin 26 for receiving a plurality of bet slips 12, as an alternative, the housing 14 could include no such storage bin but, instead, could include means, such as a slot, for receiving bet slips, one at a time, at the time they are to be marked. It should be appreciated by those skilled in the art that the present invention is not limited to an apparatus having storage means for a plurality of bet slip 12.

The embodiment shown in FIG. 1 further includes a coin box mechanism 30 of a type generally well known and commercially available for use in connection with the operation of devices of this type. Coin box mechanisms of this type are widely used in connection with the operation of photocopying machines in public facilities, such as libraries and post offices, and need not be described in detail for a complete understanding of the present invention. The coin box mechanism 30 is employed for activating or enabling use of the apparatus 10 upon the insertion of an appropriate coin or Coins into the slot 32 in a manner well known in the art. It should be appreciated by those skilled in the art that the present invention is not limited to a coin operated device but, alternatively, could be operated utilizing a credit card, debit card, bank card or any other such monetary device. Alternatively, the coin box mechanism 30 could be deleted so that a lottery agent could make an apparatus 10 available to customers as a free service.

Figure 7:
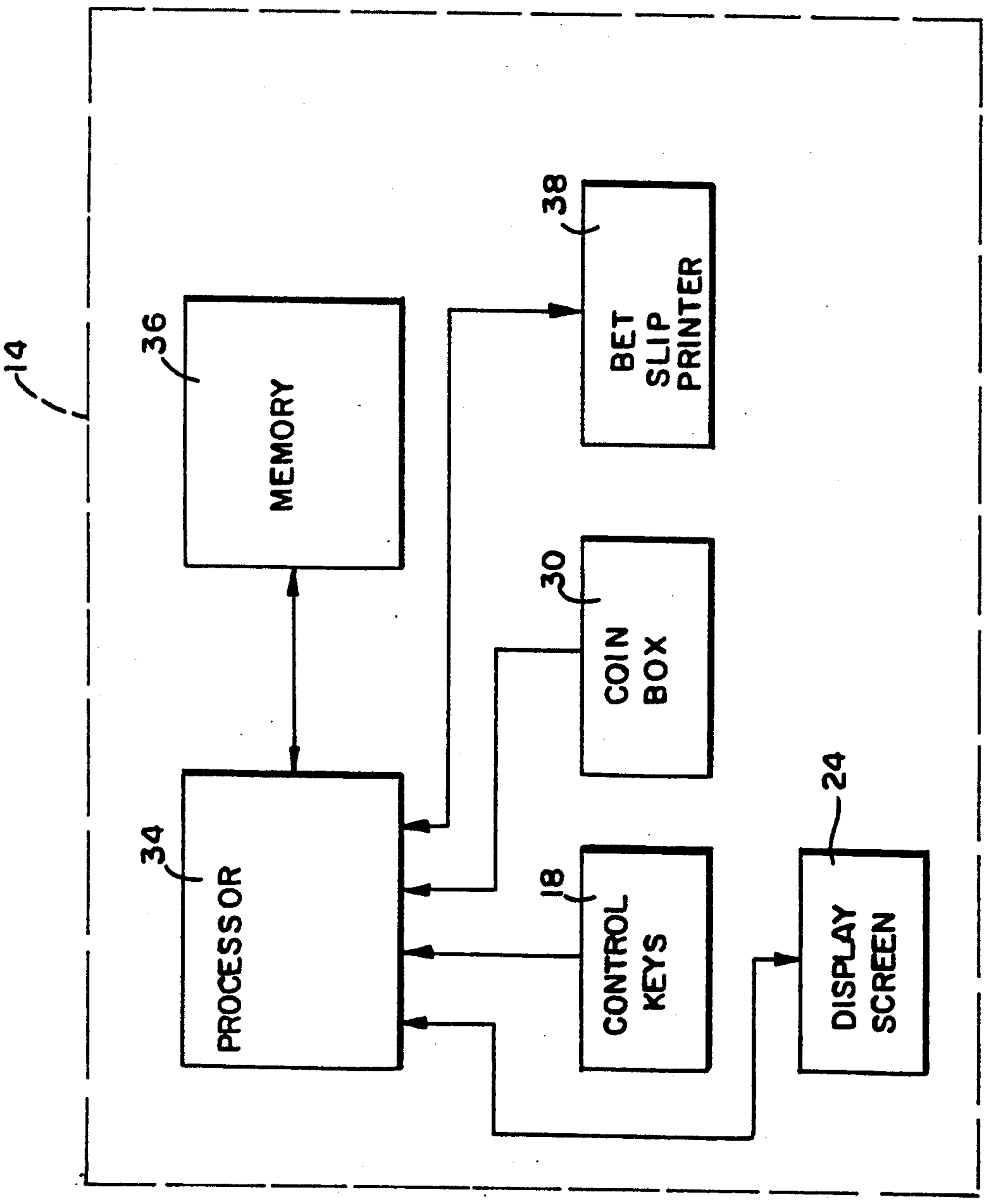
FIG. 7 is a schematic block diagram showing a preferred embodiment of a computer control system employed in the apparatus of FIG. 1.

The description set forth above relates to the exterior features of the automated bet slip marking apparatus 10. Referring now to FIG. 7, the apparatus 10 further includes a control means within the housing and communicating with the selection means or control keys 18 for identifying the operational mode selected by a customer and for generating electrical control signals responsive thereto. In the present embodiment, the control means comprises at least one programmed computer or computer system, preferably a digital computer, which is located within the housing 14. The computer includes at least one central processing unit or processor 34 which is electrically connected in a conventional manner to a suitably sized memory means or memory 36. The processor 34 is preferably a microprocessor of the type which is commercially available from a variety of different manufacturers. The memory 36 preferably comprises a random access memory, as well as a non-volatile memory, such as a read only memory (ROM), programmable read only memory (PROM), or other such device appropriate for the storage of computer programs and/or data. The processor 34 is electrically connected to the coin box 30 for enabling the operation of the apparatus 10 and to the selection means or control keys 18 in a conventional manner to facilitate the transmission of communication from the customer or user to the processor 34. Similarly, the processor 34 is electrically connected in a conventional manner to the display screen 24 to permit communication from the processor to the user. The processor 34 is also electrically connected in a conventional manner to the printer means or bet slip printer 38 to facilitate printing of a bet slip 12 in accordance with an operational mode selected by the user as expressed through the control keys 18 and the computer program stored in the memory 36.

As used herein, the terms, "program," "computer program," "software," and "software program" may be interchangeably used to mean a series or sequence of predetermined instructions which are used to control the operation of the processor 34 and its associated hardware components (display screen 24, printer 39, etc.). It will be appreciated by those skilled in the art that the present invention is not limited to any particular type of processor 34, memory 36 or other hardware components and that the type of such hardware components employed with the present invention may vary depending upon the particular configuration of the bet slip marking apparatus 10. Thus, it should be clearly understood that the computer system shown in FIG. 7 is merely for the purpose of illustrating an embodiment of the invention which is presently preferred and is not intended to limit the scope of the present invention.

It should also be understood that the computer system of the present invention operates in the same manner as any other computer system employed for controlling the operation of an apparatus. More specifically, the memory 36 is employed for storing the program which controls operation of the computer system. The processor 34 performs the operations set forth in the program instructions in accordance with a plurality of selectable operational modes, and, through interaction with the user via the control keys 18 and display screen 24, controls the operation of the bet slip printer 38 to place appropriate markings upon a bet slip 12 in a manner desired by the user, as described generally above.

Figure 2:
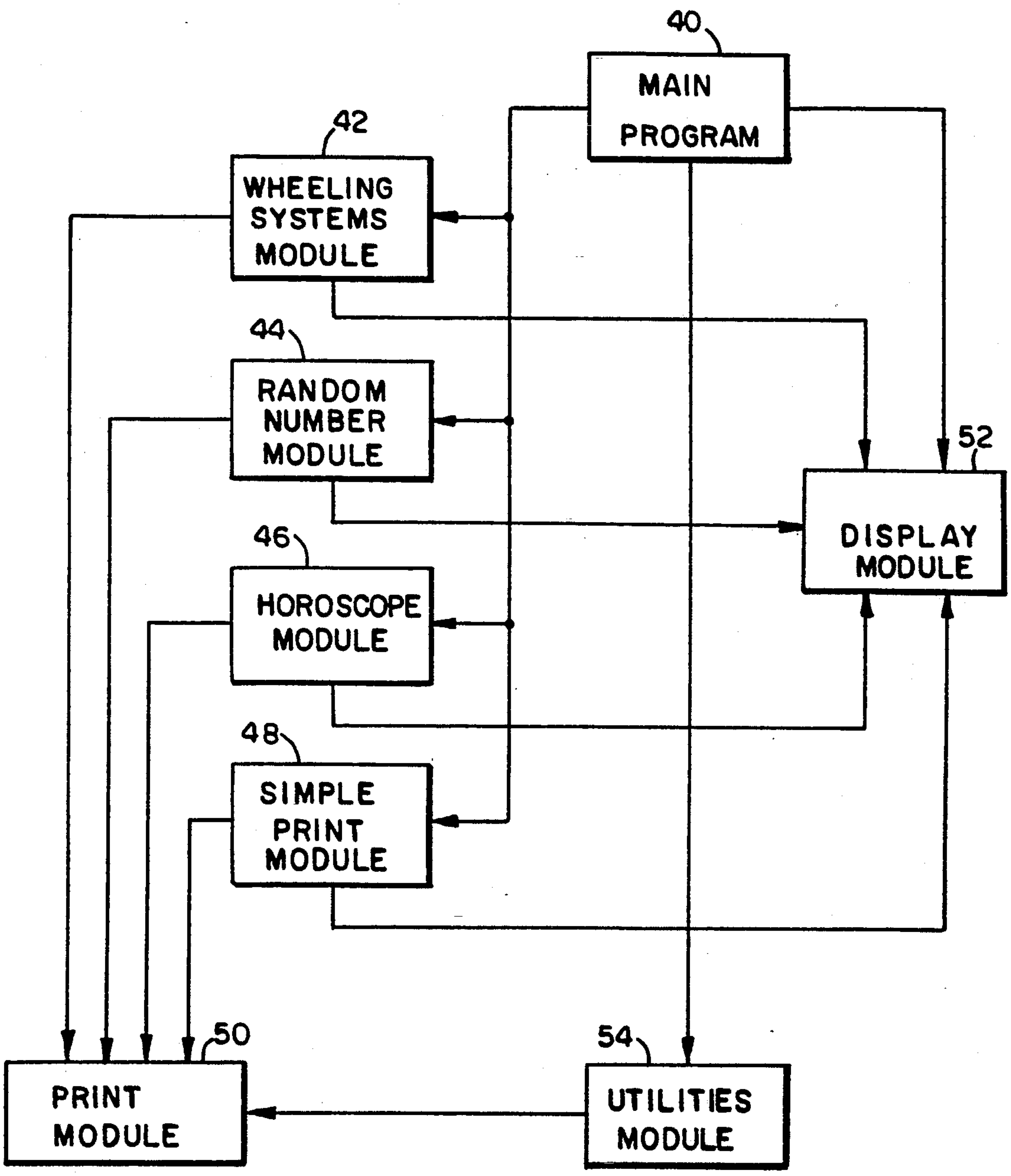
FIG. 2 is a high level schematic block diagram illustrating the operation of the apparatus of FIG. 1.

FIG. 2 is a high level schematic block diagram illustrating the primary functional aspects of the computer program employed in connection with the apparatus 10. FIG. 2 illustrates apparatus 10 with four alternative operational modes. Essentially, the computer program comprises a main, or primary, program 40 which functions substantially along the lines of an operating system. The main program 40 is adapted to branch to a series of generally self-contained, functional modules, each module including substantially a complete set of program instructions for accomplishing the particular function. Each functional module operates to generate a predetermined plurality of numerals or numbers (i.e., 6, 7, 8) selectable from an established numerical set (i.e., 40, 50) in accordance with the parameters of a particular wagering system or lottery. The functional modules in the present embodiment include a series of number generating modules, including a wheeling systems number generating module 42, a random number generating module 44, a horoscope number generating module 46 and a simple print number module 48. The general operation of each of these number generating modules 42, 44, 46 and 48 is shown in FIGS. 3, 4, 5 and 6 and will be described in greater detail hereinafter. While, in the presently preferred embodiment, only four such number generating modules or operational modes are employed, it should be understood by those skilled in the art that a greater or lesser number of such modules may be employed and that more than one of the operational modes may be performed in a single number generating module. It should also be appreciated by those skilled in the art that while four such number generating modules may be employed, the specific types of number generating modules or operational modes illustrated may vary from those employed in the present embodiment. Each of the number generating modules includes a sequence of programmed instructions which are adapted to generate the actual numbers to be entered on the bet slip 12 in accordance with the desires of the customer or user.

In addition to the number generating modules, the program includes a printing module 50 which includes a sequence of instructions to control the bet slip printer 38, a display module 52 which contains a sequence of instructions to control the information and/or data which is shown in the display screen 24 and a utilities model 54 which includes a sequence of instructions employed to assist the main program in control, maintenance and trouble shooting of the other modules, programs and the hardware components. The utilities module also contains instructions and subprograms used for record keeping with respect to the apparatus 10, including the number of transactions, time of transactions, amount of money obtained, etc. The printing module 50, display module 52 and utilities module 54 are all comprised of generally standard computer subroutines which are well known in the art for control/implementation of the particular function. Such modules or subroutines can generally be obtained from the manufacturer of the particular hardware or from a variety of software developers. For example the manufacturer of the printer hardware can provide an appropriate module or subroutine and/or information concerning the programming necessary for control of the printer. A complete description of the structure and operation of the printing module 50, display module 52 and/or utilities module 54 is not necessary for a complete understanding of the present invention and, therefore, will not be set forth herein.

Figure 4:
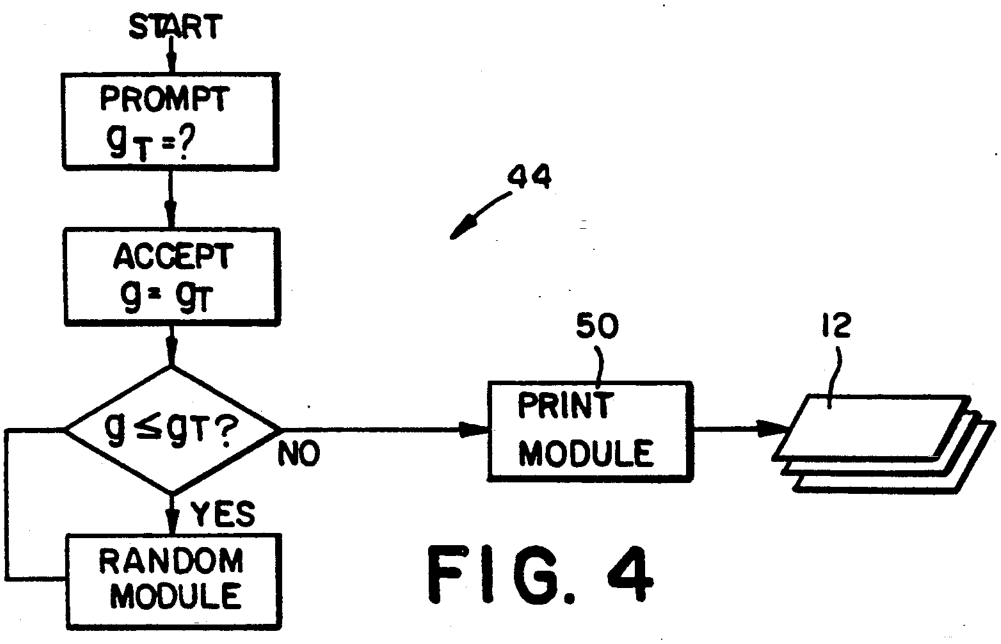
FIG. 4 is a more detailed schematic flow diagram of the random number module portion of the block diagram of FIG. 2.

FIG. 4 illustrates one mode of operation, the random number module 44 of the present invention, in generating a predetermined plurality (n) of randomly selected numbers or digits from an established numerical set for a selected number of game(s) for completion of a bet slip for entering bets for the selected number of games. If a user desires to generate a bet based upon a series of randomly generated digits, the user selects the random module by depressing the proper control key or keys from the first group 20. The program then prompts the user, through the display screen 24, to select the number of games for which numbers are to be randomly generated. The number of games is selected by the user by depressing the appropriate control key or control keys of the second group 22. Thereafter, the program loops through a random number generating means or random module the appropriate number of times for generating the appropriate number of digits or numbers within the game parameters for the number of games selected. The random number module is also comprised of a standard subroutine which is generally well known in the art and publicly available and operates to generate a series of exclusive random numbers each time that it is accessed. The random numbers generated are from the numerical set for the particular lottery game and each number in the series is not repeated. When the proper number or numbers of digits have been selected, the data is passed to the print module 50 which controls the actual printing of the selected numbers or digits onto the bet slip or bet slips 12.

If desired, the random number generating module 44 can be programmed to enable the user to select games partially at random and/or without repeating a number selected in one game in any subsequent games. For example, random number module 44 may permit the user to select three digits and, thereafter, may automatically select the remaining three digits. Other modifications may be made to the program of the random number generating module to accomplish any desired type of number selection in a manner well known in the art.

Figure 5:
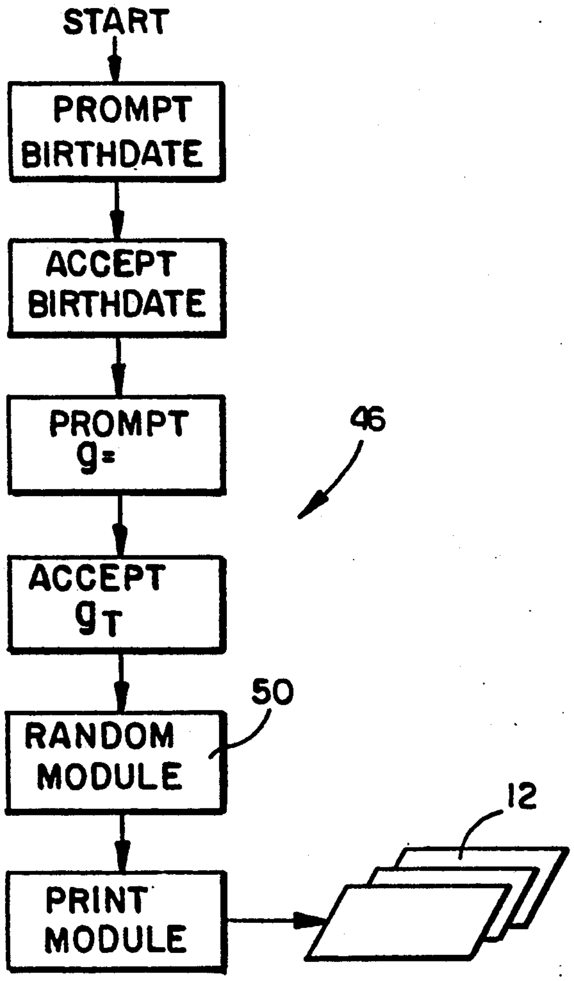
FIG. 5 is a more detailed schematic flow diagram of the horoscope module portion of the block diagram of FIG. 2.

FIG. 5 generally illustrates the operation of the apparatus 10 in another operational mode employing the horoscope number generating module 46. Assuming that the user selects the horoscope module 46, the user is prompted to enter a selected birth date utilizing the second group of control keys 22. The numbers entered by the user are then used by the random module to create a "seed" or base number for subsequent random number generation. Once the appropriate number of numbers have been generated, the print module 50 is accessed for printing of the numbers upon the bet slip or bet slips 12.

Figure 6:
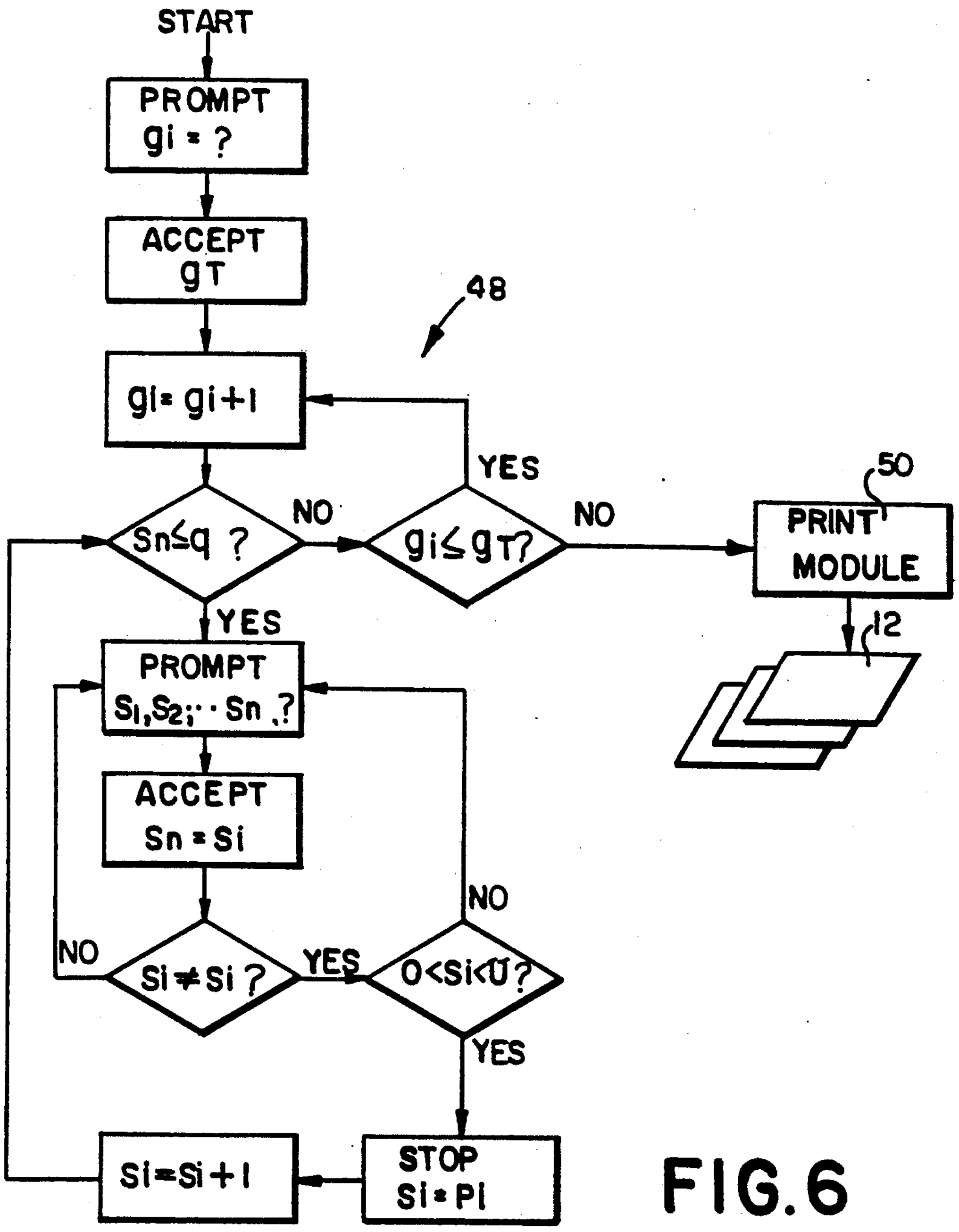
FIG. 6 is a more detailed schematic flow diagram of the simple print module portion of the block diagram of FIG. 2.

FIG. 6 generally illustrates another mode of operation of the apparatus which employs the simple print number generating module 48. If the user selects the simple print module, the user is prompted to select and enter the number of games to be printed on the bet slip. Thereafter, the user is prompted to select and enter directly the desired numbers utilizing the control keys of the second group 22. The simple print module 48 checks each number to make sure that it has not already been entered by the user. The program also includes checks to make sure that all of the numbers are selected for the desired number of games. Thereafter, the print module 50 is accessed for printing the selected numbers onto the bet slip or bet slips 12.

Figure 3:
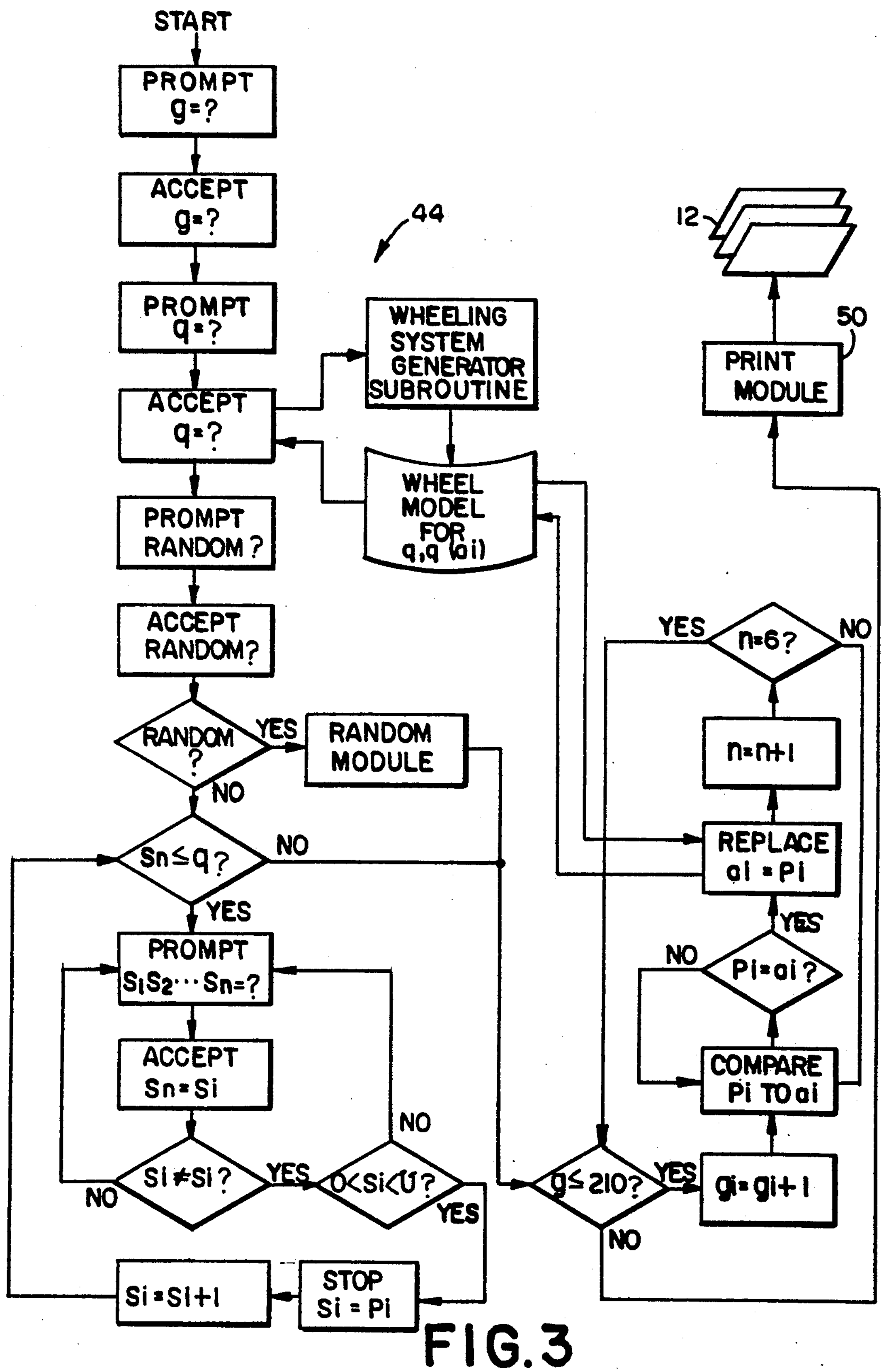
FIG. 3 is a more detailed schematic flow diagram of the wheeling system module portion of the block diagram of FIG. 2.

FIG. 3 generally illustrates the structure and functioning of the wheeling systems number generating module 42 as another mode of operation. The wheeling systems module 42 permits the user to select a wheeling system which is comprised of up to q numbers wheeled into g games of n numbers each, the numbers being selected as six for illustration and the illustrated number of games selected as 210. The program instructions within the wheeling systems module 42 allows for the creation of wheeling systems of any desired size, depending upon the storage capacity of the computer system memory 36. Mathematically, all of the combinations of q numbers considered as sets of n numbers constitute such a wheel and is derived from the equation:

$$_{q}C_{n} = \frac{q!}{n!\,(q-n)!} = g$$

Each set of n unique numbers constitutes a complete game. The wheel created from q numbers contains in its g games, subsets of the analogous full combination sets of all possible sets for smaller sized wheels. Thus, the program strategy is to generate the q-number wheel for all wheeling systems, substituting 0 for the last q in a (q−1) number wheel, 0 for the last two q-numbers in a (q−2) number wheel, 0 for the last three q-numbers in a (q−3) number wheel, etc.

The user is sequentially prompted to provide the number of games to be wheeled (g) and the number of numbers (q) used to create the games. After accepting the inputs from the user, the program prompts the user to determine if the user desires the numbers (q) to be generated at random, or if the user wishes to select those numbers utilizing the second group of control keys 20.

If the user chooses to select the numbers, the programming prompts the user to enter the numbers to be used in the wheel, one at a time, checking each number to insure that it has not already been selected in that wheel, and also checking to make sure that each of the selected numbers is within the range of numbers for the particular lottery game. If either or both of the checks fail, the user is prompted to enter a new number. When all of the selected numbers are accepted, the numbers are displayed on the display screen 24 and are stored in the memory 36.

If the user chooses random selections, the program branches to the random which generates the required number of unique random numbers within the range of the particular game, the numbers being stored in the memory 36. Once all of the numbers for the wheeling system have been selected, the numbers are placed in the appropriate positions of the model wheel, the first selected number being placed at position 1, the second number being placed in position 2, etc., until all of the positions are filled in the sequence that the numbers were selected, with non-selected positions being automatically filled with zeros. The model wheel then contains all possible combinations of numbers identified positionally for a wheel containing the desired number of games, in this embodiment 210. The programming then recreates the model wheel, placing the selected numbers in their positions for the selected number of games and the print module 50 is accessed for printing the bet slip 12 accordingly.

In operation of the apparatus 10, a user initiates operation by inserting a coin or number of coins into the coin slot 32. Assuming that the coin or coins inserted are appropriate (i.e., the correct amount of money), the main program 40 is enabled, prompting the user to select the operational mode which the user wishes to employ. The user responds by entering the selected mode of operation by depressing the appropriate control key or keys from the first group 20. Thereafter, the main program branches to the appropriate number generating module 42, 44, 46 or 48 which is employed in the manner discussed generally above for generation of the appropriate number of numbers from the established numerical set for the particular betting system or lottery. Thereafter, the print module 50 is automatically accessed and the generated numbers are printed onto a bet slip or bet slips 12 received from the storage bin 18. When each bet slip 12 has been printed by the printer 38, it is ejected from the housing 14 into the card receiving bin 28. The user may then remove the printed bet slip 12 from the apparatus 10 and utilize the bet slip for placing a lottery bet with an appropriate lottery agent in the manner well known in the art.

From the foregoing description and the appended drawings, it can be seen that the present invention comprises an apparatus for the automated marking of a bet slip for use in entering a customer wager into a wagering machine. It will be recognized by those skilled in the art that while the above-described embodiment is merely illustrative of one form of the invention, changes or modifications could be made to this embodiment without departing from the broad inventive concepts thereof. Therefore, it should be understood that this invention is not limited to the particular above-described embodiment, but it is intended to extend to the entire scope and spirit of the invention, as set forth in the appended claims.

What is claimed is:

1. A stand-alone apparatus for the automated marking of a bet slip unique to a specified lottery game where the marked bet slip is to be used as the bet slip for machine entry of a customer wager into an independent lottery wagering terminal, the apparatus comprising:

a bet slip comprising printed markings representative of a customer wager, the printed markings being in a format which is machine readable by said independent lottery wagering terminal;

a housing for receiving the bet slip;

selection means within the housing and actuatable by a customer for permitting the customer to select a desired number generating mode of operation from a plurality of alternative operational number generating modes for marking the bet slip;

control means within the housing and communicating with the selection means for identifying the mode selected by the customer and for generating electrical control signals representative of numbers generated in accordance with the selected mode; and printer means communicating with the control means for receiving the bet slip, for receiving the electrical control signals and for printing the machine readable markings on the bet slip in accordance with the received control signals and the machine readable format;

whereby the markings printed on said bet slip may thereafter be machine read by said independent lottery wagering terminal.

2. The apparatus as recited in claim 1 wherein the housing includes storage means for receiving and storing a plurality of bet slips and for permitting the bet slips to be selected one at a time.

3. The apparatus as recited in claim 1 wherein the printer means is located within the housing and includes means for receiving the bet slip from a supply of bet slips within the housing.

4. The apparatus as recited in claim 1 wherein the selection means includes a plurality of control keys located on a surface of the housing, at least one of the control keys being actuatable by the customer for selection of the desired mode for marking the bet slip.

5. The apparatus as recited in claim 1 wherein the customer wager comprises a predetermined plurality of numerals selectable from an established numerical set and wherein the selection means includes means for permitting the customer to select a first mode of operation in which each of the plurality of numerals is selected by the customer.

6. The apparatus as recited in claim 1 wherein the customer wager comprises a predetermined plurality of numerals selectable from an established numerical set and wherein the selection means includes random number generating means for generating random numerals within the established numerical set and wherein at least one of the plurality of numerals of the customer wager is selected by the random number generating means.

7. The apparatus as recited in claim 6 wherein all of the plurality of numerals of the customer wager are selected by the random number generating means.

8. The apparatus as recited in claim 6 wherein the random number generating means operates from an initial base number and wherein the selection means includes means for permitting the customer to select the base number.

9. The apparatus as recited in claim 8 wherein the base number relates to a birth date selected by the customer.

10. The apparatus as recited in claim 1 wherein the customer wager comprises a predetermined plurality of numerals selectable from an established numerical set and wherein the selection means includes a predetermined mathematical algorithm which permits the customer to select a numeral from within the numeral set, the mathematical algorithm operating upon the selected numeral for generating each of the remaining numerals of the customer wager.

11. The apparatus as recited in claim 10 wherein the mathematical algorithm is related to the date of birth of the customer.

12. The apparatus as recited in claim 1 further including display means within the housing for displaying to the customer the customer wager to be marked on the bet slip.

13. A stand-alone apparatus for the automated marking of a bet slip unique to a specified lottery game where the marked bet slip is to be used as the bet slip for machine entry of a customer wager into an independent lottery wagering terminal, the apparatus comprising:

a bet slip comprising printed markings representative of a customer wager, the printed markings being in a format which is machine readable by said independent lottery wagering terminal;

means for receiving or generating the bet slip;

selection means actuatable by a customer for permitting the customer to select a desired number generating mode of operation from a plurality of alternative operational number generating modes for marking the bet slip;

control means in communication with the selection means for identifying the mode selected by the customer and for generating electrical control signals representative of numbers generated in accordance with the selected mode; and printer means communicating with the control means for receiving the electrical control signals, and for printing the machine readable markings on the bet slip in accordance with the received control signals and the machine readable format;

whereby the markings printed on said bet slip may thereafter be machine read by said independent lottery wagering terminal.

* * * * *